United States Patent [19]

Lang et al.

[11] Patent Number: 4,785,465
[45] Date of Patent: Nov. 15, 1988

[54] CIRCUIT ARRANGEMENT FOR SERIAL DATA TRANSMISSION BETWEEN A PLURALITY OF SUBSCRIBER STATIONS

[75] Inventors: Otto Lang; Manfred Dombrowski, both of Munich, Fed. Rep. of Germany

[73] Assignee: Siemens Aktiengesellschaft, Berlin and Munich, Fed. Rep. of Germany

[21] Appl. No.: 14,536

[22] Filed: Feb. 13, 1987

[30] Foreign Application Priority Data

Feb. 17, 1986 [DE] Fed. Rep. of Germany ....... 3604967

[51] Int. Cl.⁴ ............................ H04B 1/40; H04B 9/00
[52] U.S. Cl. ............................... 375/7; 375/8; 375/17; 455/607
[58] Field of Search ................ 375/7, 17, 36, 8; 455/58, 606–608, 617, 618; 370/85, 94; 340/825.5

[56] References Cited

U.S. PATENT DOCUMENTS 4,649,548  3/1987  Crane ..................................... 375/7

FOREIGN PATENT DOCUMENTS 2229328  12/1974  France .
2363240   3/1978  France .

OTHER PUBLICATIONS

Selected Interface Circuits Data Book for Design Engineers, Texas Instruments, 1982, pp. 388–389.
Bruins, T., "Data Transmission is Faster with Ternary Coding", Electronics, May 30, 1984, pp. 119–120.
Pippenger, D., "Line Drivers . . . Computer Systems", Electrical Design News, Mar. 15, 1972, pp. 44–46.
Burgess, R., "RS422 and Beyond", Electronic Engineering, Oct. 1981, pp. 81–85.
Baker, S., "Interface Standard RS-485 . . . anwerdbar", Elektronik, 1984, p. 24.

*Primary Examiner*—Robert L. Griffin
*Assistant Examiner*—Marianne Huseman
*Attorney, Agent, or Firm*—Hill, Van Santen, Steadman & Simpson

[57] ABSTRACT

A circuit arrangement is provided for serial data transmission between a plurality of subscriber stations via a loaded data bus and having transmitters that are in a high-impedance state in the passive condition and in a low-impedance state in the active condition. In such a circuit arrangement, a mutual control of the subscriber stations occurs via the data bus per se without the assistance of additional control lines. This is achieved with the assistance of a recognition circuit which emits a free signal at its output given at least approximately identical voltages at the data bus and emits a busy signal given different voltages at the data bus. The control arrangement is particularly suitable for utilization in remote control stations.

7 Claims, 2 Drawing Sheets 4,785,465

CIRCUIT ARRANGEMENT FOR SERIAL DATA TRANSMISSION BETWEEN A PLURALITY OF SUBSCRIBER STATIONS

CROSS REFERENCE TO RELATED APPLICATIONS

This application is related to application Ser. No. 015,710 filed Feb. 17, 1987 and application Ser. No. 015,713 filed Feb. 17, 1987.

BACKGROUND OF THE INVENTION

1. Field of the Invention

The present invention relates to a circuit arrangement for serial data transmission between a plurality of subscriber stations, comprising at least two data transmitters that have their output terminals connected to one and the same data bus which comprises two leads, respectively having a control input connected to a control arrangement and being controllable such that at most one of the data transmitters is activated at a given time, whereby the data transmitters, in their activated conditions, emit a voltage of a first polarity or a second polarity to the data bus dependent on the state of a data signal applied to the input, whereby the data transmitters have a higher internal resistance at the output in the passive condition than in the active condition, and whereby at least one data receiver is connected to the data bus, the data receiver, in the manner of a differential amplifier, assuming one of two prescribed signal states at its output given an input voltage and dependent on the polarity of the input voltage, and whereby the data bus is loaded with an effective load between the two leads at at least one location, the effective load being of such a nature that the voltage between the leads of the data bus has at least about the value zero given nonactive data transmitters.

2. Description of the Prior Art

A circuit arrangement of the type generally set forth above is already known from the periodical "Elektronik", 6/23 Mar. 1984, page 24 and 12/15 June 1984 pages 97 and 98.

The cited known circuit arrangement contains interface modules for serial transmission, each of which is composed of a data transmitter and a data receiver and is suitable for full-duplex or half-duplex operation. In half-duplex operation, the output of the data transmitter is directly connected to the input of the data receiver in each subscriber station. The subscriber stations can be a computer, for example, and peripheral devices connected thereto which are connected to a data bus. The data transmitter and the data receiver in each subscriber station can be driven into an active condition or into a passive condition by control signals.

Further, the Data Book of Texas Instruments, Interface Circuits, 1980 Edition, Page 388, discloses a circuit arrangement comprising interface modules in which both ends of the bus are terminated by a resistor having the value of the characteristic impedance. In relationship to the internal resistances at the output side of inactive data transmitters, such a resistor is so small that the voltage between the leads of the data bus has at least approximately the value zero.

Since, in a circuit arrangement of the type set forth above, the data transmitters, in the active condition, represent a low-impedance voltage source at their outputs whose voltage is dependent upon the logic level of the data signal applied to the respective input, only one data transmitter can be active at a given time.

To this end, the control signal that drives the data transmitter of a subscriber station into its active condition can be transmitted to all other subscribers and can be used at the other subscribers to make an activation impossible for the time in which the data bus is occupied. It is thereby obvious to transmit control signals via a control line or via a control bus which is provided in addition to the data bus.

SUMMARY OF THE INVENTION

The object of the present invention is to provide a circuit arrangement as set forth above such that a mutual control of the subscriber stations occurs via the data bus itself without the assistance of additional control lines, this mutual control being accomplished such that the subscriber stations can access the data bus on their own when the bus is not occupied by another subscriber station.

Given a circuit arrangement of the type set forth above, all data transmitters are high-impedance devices at their outputs given an unoccupied data bus. Proceeding from the perception within the scope of the invention that the high-impedance tristate condition is exploitable for control purposes, the circuit arrangement for achieving the above object is constructed in such a manner that it is particularly characterized in that at least one of the control arrangements is preceded by a recognition circuit which outputs a free signal at its output having a first logic state given at least approximately identical voltages at the leads of the data bus and outputs a busy signal having a second logic state to the control arrangement given different voltages at the lines of the data bus . The data transmitters can thereby be connected to the subscriber stations in unmediated or mediated fashion, particularly by way of transmission devices that are provided with modems.

The load with which the data bus is loaded at at least one location can be formed by terminating impedances, input resistors of the recognition circuit and/or other load resistors. In particular, the load is entirely, or partly, composed of terminating impedances having the value of the characteristic impedance of the data line with which the data line is provided in view of a high bit rate of the data signal to be transmitted.

The data transmitters can be of such a nature that they have, respectively, a positive potential in comparison to a reference potential or ground at the one output terminal and have a negative potential in comparison thereto at the other output terminal. On the other hand, there are data transmitters that, in their activated condition, have a first prescribed voltage at one of the two output terminals and have a second prescribed voltage, higher than the first prescribed voltage and of the same polarity, with respect to the reference potential at the other of the two output terminals, so that differently-polarized output voltages likewise occur. Data transmitters of interface modules that are conceived for the interfaces RS485, RS422 and the like are, in particular, of this type. The interface RS485 is known for half-duplex operation via a two-wire data bus and the interface RS422 is known for full-duplex operation or half-duplex operation via a four-wire data bus.

An advantage which derives on the basis of the foregoing measures is that the subscriber station can acquire information concerning the occupancy of the data bus with structures that are simple to realize without a separate control bus being required for this purpose. With particular advantage, the busy signal can be used for the control of one or more modems such that the transmitter of the modem or, respectively, the transmitters of the modems are driven into the active or passive condition dependent on the occupancy of the data bus. When a modem seizes the data bus, then the data transmitters of all other modems are automatically activated without the requirement of switch over devices comprising involved control structures.

The recognition circuit can be formed by an unpolarized relay whose winding is connected to the two leads of the data bus and which responds when a data transmitter is active. Since the winding of the relay loads the data bus, no voltage adequate for excitation of the relay can then build up on the data bus when all data transmitters are inactive and therefore comprise a relatively high-impedance internal resistance at their respective outputs. When, by contrast, a data transmitter is active, then a voltage that constantly changes in polarity in accordance with the data to be transmitted occurs between the leads of the data bus. Since the relay is not polarized, it then nonetheless responds.

According to another feature of the invention, the circuit arrangement is constructed in such a manner that it is characterized in that the recognition circuit contains two optocouplers whose inputs are connected to the data bus in an anti-parallel manner and whose outputs are isodirectionally connected in parallel, and in that the parallel circuit is connected to a d.c. voltage source via a resistor, and in that the series circuit of optocouplers and resistor is a component portion of an evaluation arrangement which outputs a free signal at its output having a first logic state given identical logic levels at the inputs of the recognition circuit and which emits a busy signal having a second logic state to the control arrangement given unequal logic levels at the inputs of the reognition circuit. The data bus is thereby loaded such by the diodes of the optocoupler that, given nonactive data transmitters at the data bus, no voltage that could lead to a response of the optocouplers can build up. When, by contrast, a data transmitter is active, then a voltage having alternating polarity builds up on the data bus. Respectively one or the other optocoupler responds dependent on the polarity of the appertaining pulse.

In embodiments of the invention involving an unpolarized relay or the two optocouplers in the recognition circuit, the recognition circuits represent a load to the data bus that guarantees a reliable operation of the recognition circuit. Under given conditions, additional load, particularly terminating impedances, can be present at the data bus.

When the data bus is provided with a terminating impedance at at least one location, then, in accordance with a further feature of the invention, the recognition circuit can be formed by an EXCLUSIVE OR gate. The EXCLUSIVE OR gate can thereby be relatively high-impedance at its input.

A subscriber station dare not access the data bus when it has already been occupied by another subscriber. When a subscriber station has seized the data bus, the recognition circuit recognizes such seizure. In such a case, however, the data bus continues to be available to the subscriber station.

When the subscriber station itself does not contain a device that prevents self-disconnection of the subscriber station in the operating state under consideration, then it is expedient to forward a busy signal to the subscriber station only when the data bus is occupied by a different subscriber station.

Since the data transmitters in the subscriber stations are activated with the assistance of control signals, these control signals make criteria available regarding whether an identified occupation of the data bus may possibly occur from the appertaining subscriber station itself. A common evaluation or logic operation of the control signal and of the busy criterion therefore permits a determination regarding whether the data bus is occupied by the appertaining subscriber station or by some other subscriber station.

For this purpose, the circuit arrangement is particularly characterized in that a control input of the subscriber station preceding the assigned data transmitter is respectively preceded by an AND gate that has a first input connected to the recognition circuit and that has a second input, together with the appertaining data transmitter controllable by the subscriber station such that the AND gate is initialized only given a passively controlled data transmitter.

Dependent on the type of control circuit, with or without following negation, the AND gate inhibits the criterion "data bus occupied" when the appertaining subscriber station itself seized the data bus.

An arrangement that advantageously eliminates disturbances or, respectively, needle pulses arising due to switching events is particularly characterized in that the output of the evaluation device is connected to a Schmitt trigger via an RC element.

An arrangement which is further characterized in that the Schmitt trigger is constructed as an AND gate has the advantage that the Schmitt trigger simultaneously eliminates disturbances and realizes the desired AND operation or NAND operation.

BRIEF DESCRIPTION OF THE DRAWINGS

Other objects, features and advantages of the invention, its organization, construction and operation will be best understood from the following detailed description, taken in conjunction with the accompanying drawing, on which.

DESCRIPTION OF THE PREFERRED EMBODIMENTS

Figure 1:
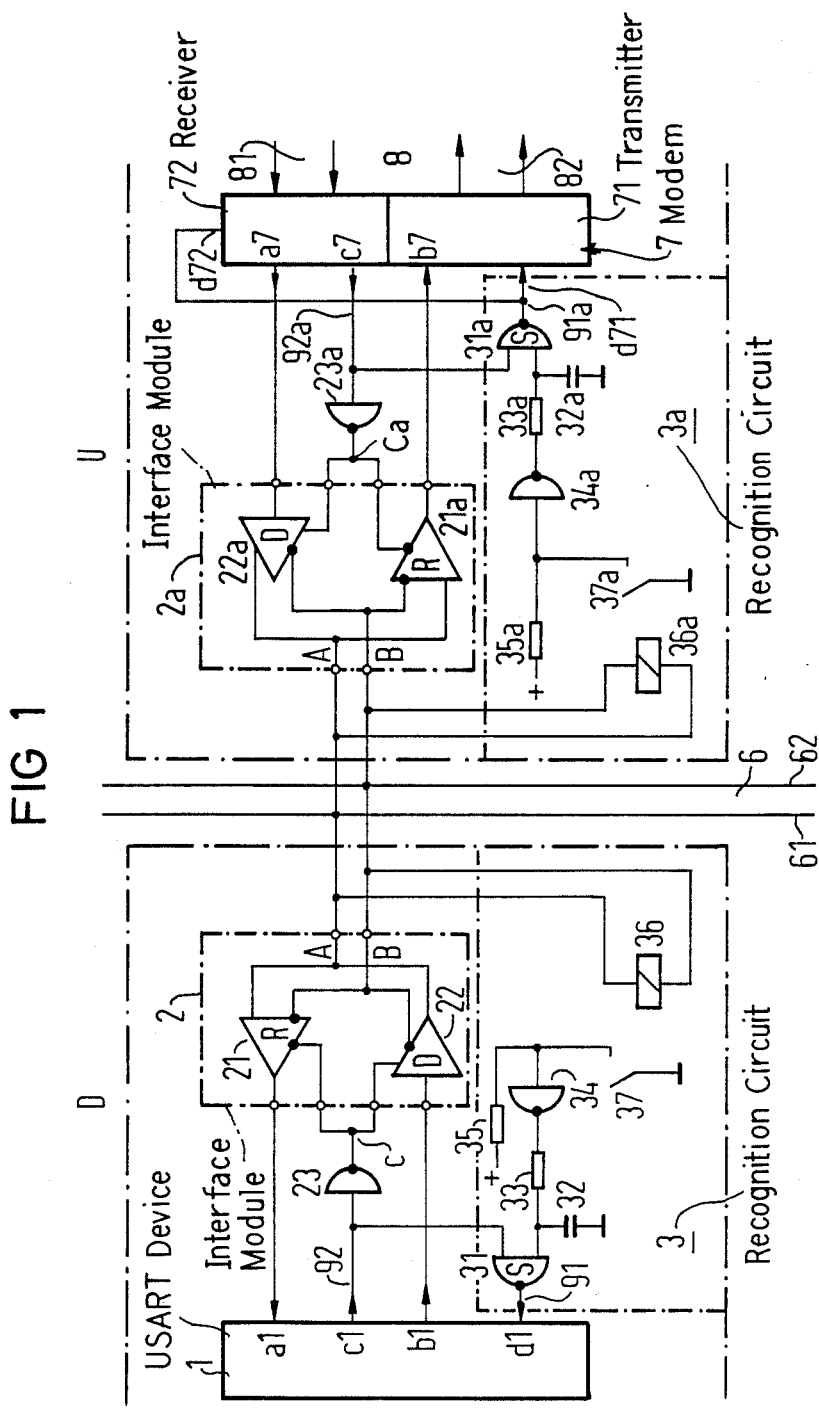
FIG. 1 a schematic circuit diagram of a circuit arrangement for serial data transmission between a plurality of digital and transmission assemblies connected to one another via a data bus and comprising recognition circuits containing relays.

Referring to FIG. 1, a circuit arrangement is illustrated for serial data transmission. The two-wire bus 6 connects a plurality of assemblies of a remote control apparatus or of a remote control device, the digital assembly D and the transmission assembly U thereof being illustrated on the drawing. In addition to be used for data transmission, the two leads 61 and 62 of the data bus 6 are also used for the communication control signals that serve for the mutual control of the assemblies.

The digital assembly D is a device for executive sequencing and, as a subscriber station 1, contains a USART device 1 controlled by a microprocessor, an interface module 2 and a recognition circuit 3.

The transmission assembly U comprises a modem 7 connected to a four-wire audio frequency line 8 which comprises a transmitter 71 and a receiver 72, and further comprises an interface module 2a and a recognition circuit 3a. The modem 7 is composed of, for example, an FM transmitter and an FM receiver. The audio frequency transmission line 8 leads to at least one further subscriber station and is a component of a remote control network comprising a plurality of stations or, respectively, further subscriber stations in the example set forth herein. The transmission line is a four-wire line comprising an incoming line 81 and an outgoing line 82. A two-wire line can be employed, when warranted, instead of the four-wire line. In this case, the ransmitter 71 and the receiver 72 are to be connected to the two-wire line.

Further digital and/or transmission assemblies can be connected to the two leads 61 and 62 of the bus 6. In particular, such further digital assemblies can be devices for a status signal input or output. Further transmission assemblies can serve the purpose of forwarding the serial data onto the bus 6 by a digital assembly or by a transmission assembly to further transmission lines and stations connected thereto.

An interface suitable for such a multipoint bus configuration serves as an interface between the assemblies and the data bus 6, the data transmitters 22 or, respectively, 22a being high-impedance devices at their outputs in the unactivated condition. In particular, the interface RS485 is such an interface.

In a departure from FIG. 1, the data bus 6 can be terminated at both ends by a respective resistor between the two leads 61, 62 which has the characteristic impedance thereof. All subscriber stations lie at a common ground potential by way of a connection to the ground that is not shown on the drawings.

For connection to the data bus 6, the assemblies, of which the drawing illustrates one digital assembly D and one transmission assembly U, are each provided with a respective interface module 2 or, respectively, 2a which, for example, can be of the type SN75176a.

In the interface module 2 of the digital assembly D, the output terminals A and B of the data transmitter 22 are directly connected to the input terminals of the data receiver 21. The terminal A is connected to the lead 61 and the terminal B is connected to the lead 62 of the data bus 6.

The data transmitter 22 and the data receiver 21 each have their control terminals connected to the common control line C can be alternatively driven active and passive by control signals, so that only the data transmitter 22 or the data receiver 21 can be respectively active at one time.

The interface module 2a of the transmission assembly U is constructed like the interface module 2 of the digital assembly D. The output of the data transmitter 22a is directly connected to the input of the data receiver 21a. The data transmitter 22a and the daa receiver 21a each have their control terminals connected to a common control line Ca.

On the other hand, it can be advantageous in the digital assembly D, to control only the data transmitter 22 via the control line C and to always leave the data receiver 21 switched on. Therewith, the data signal transmitted onto the bus 6 by the digital assembly D can be simultaneously evaluated for supervision.

In the digital assembly D, the output of the data receiver 21 is connected to the data input al of the USART device 1. The input of the data transmitter 22 is connected to the data output bl of the USART device 1. The control input of the data receiver 21 and the control input of the data transmitter 22 are connected to another and to the control line C. The control output cl of the USART device 1 is connected via an inverter 23 to the control line C of the interface module 2.

The recognition circuit 3 comprises an unpolarized relay 36 whose winding is directly connected to the leads of the data bus 6. The relay 36 comprises a contact 37 which is a make contact connected to ground on one side and connectible to a positive auxiliary voltage at the other side via a resistor 35. The input of an inverter 34 is connected to the junction of the contact 37 and the resistor 35. The unpolarized relay 36 responds regardless of the direction of the excitation current.

The output of the inverter 34 is connected to the signal input of a Schmitt trigger 31 via an RC element which comprises a resistor 33 and a capacitor 32. A control input of the Schmitt trigger 31 is connected to the control output cl of the USART device 1.

The two inputs of the Schmitt trigger 31 are linked to one another in the manner of an AND gate. The inverting output of the Schmitt trigger 31 is connected to a control input dl of the USART device 1 via a control line 91.

The recognition circuit 3a comprises an unpolarized relay 36a whose winding is directly connected to the leads of the data bus 6. The relay comprises a contact 37a as a make contact. This make contact is connected to ground on one side and is connected to a positive auxiliary voltage at the other side by way of a resistor 35a. The input of an inverter 34a is connected to the junction of the contact 37a and the resistor 35a.

The output of the inverter 34a is connected to a signal input of a Schmitt trigger 31a via an RC element comprising a resistor 33a and a capacitor 32a. A control input of the Schmitt trigger 31 is connected to the control output 7 of the modem 7.

The two inputs of the Schmitt trigger 31a are linked to one another in the manner of an AND gate. The inverting output of the Schmitt trigger 31a is connected to the control input d71 and d72 of the modem 7 via a control line 91a.

An interface module of the type SN75176A or μA96176 can be employed, for example, as the data transmitter 21 and the data transmitter 22 or, respectively, the data transmitter 21a and the data receiver 22a.

When the remote control station illustrated in FIG. 1 transmits, the transmission data are available at the output bl of the USART device 1, are converted to the interface level in the data transmitter 22 of the interface module 2 serving as a driver, are fed via the lines 61 and 62 of the data bus 6 to the data receiver 21a of the interface module 2a, are converted to the TTL level by the latter and are output to the input b7 of the transmitter 71 contained in the modem 7.

In the receiving condition of the remote control station, the receiving data are available at the output a7 of the receiver 72 contained in the modem 7, are converted to the interface level in the data transmitter 22a of the interface module, are fed via the leads 61, 62 of the data bus 6 to the data receiver 21 of the interface module 2, are converted to the TTL level by the latter and are output to the data input al of the USART device 1.

The tristate condition of the RS485 data bus 6 corresponding to a logic level "0" on a control line C or, respectively Ca, signals the connected assemblies that they can have access to the data bus. When an assembly accesses the data bus 6, then the data bus assumes a non-tristate condition. The evaluation of this condition leads to the formation of a control signal in the further assemblies which switches the control line 91 or, respectively, 91a to the logic level "0" and thus inhibit access of all other assemblies to the bus. This control signal also drives the transmission assembly (assemblies) such that their transmitters 71 becomes active toward the transmission line 8 and such that their receivers 72 are inhibited.

The USART device 1 can be, for example, of the type SAB8251A.

The control of the interface module via the bus 6 comprises the following operating conditions.

(a) When the data bus 6 is not occupied, i.e. when all data transmitters 22, 22a are in the high-impedance tristate condition, the two leads 61 and 62 of the data bus assume an approximately identical potential since they are connected to one another via the resistance of the relay 36. This resistance, potentially in combination with a further load, is comparatively a low impedance with respect to the extremely high-impedance output resistances of inactive data transmitters, even given a high number of windings. The relays 36, 36a are in the idle condition and their contacts 37, 37a are opened.

A voltage that corresponds to the logic level "1" thereby respectively occurs at the input of the complimentary-metal-oxide-semiconductor (CMOS) inverters 34 and 34a. The output of the Schmitt trigger 31 or the Schmitt trigger 31a is therefore switched to the logic level "1" regardless of the logic level of the control signal applied at its control input.

In the digital assembly D and, under given conditions, in further digital assemblies, the logic level "1" on the control line 91 signals the USART device 1 that the data bus is not occupied. In this case, the audio frequency transmission line 8 of the remote control network is also not occupied. In the transmission assembly and, under given conditions, in further transmission assemblies, the logic level "1" on the control line 91a drives the receiver 72 for reception and inhibits the transmitter 71.

(b) When the data bus 6 is seized by the digital assembly, then, in the seizing digital assembly, the control output cl of the USART device 1 switches the control line 92 to the logic level "0". The inverter 23 activates the data transmitter 22. The output of the data transmitter 22 is therefore in a low-impedance state. Dependent on the logic state at the data outputs bl of the USART device 1, a logic level "1" or a logic level "0" is transmitted via the data bus 6.

The two prescribed voltages that the output terminals A, B of the data transmitters 22, 22a can assume relative to the reference potential have the same polarity. In the case of the interface RS485, the voltage 3.7V, for example, lies at the output terminal A of the interface module 2 given the logic level "1" and, for example, the voltage 1.1V with respect to ground lies at the output terminal B. Given the logic level "0", the voltage 1.1V, for example, lies at the output terminal A and the voltage 3.7V, for example, lies at the output terminal B. Given an activated interface module and a bus 6 thereby occupied, one of the two leads 61 or 62 therefore fundamentally lies at the low potential of, for example, 1.1V and the other lead lies at the high potential of, for example, 3.7V. The voltage difference causes the relay 36a to respond. In all assemblies, therefore, the outputs of the inverters 34 or, respectively 34a switch to the logic level "1".

In the active digital assembly D, this signal is not transmitted since the Schmitt trigger 31 is inhibited by a logic level "0" from the control output cl of the USART device 1.

In the operating conditions under consideration, further digital assemblies (not shown on the drawing) that may be present, by contrast, are not active, so that the Schmitt triggers are opened by the logic level "1". The logic level "1" at the output of the inverter therefore drives the control line to the logic level "0" via the following Schmitt trigger, informs the USART device that the data bus 6 is occupied by another assembly and therefore inhibits access to the data bus 6.

In the transmission assembly U and, under given conditions, in further transmission assemblies, the logic level "1" at the output of the inverter 34a drives the control line 91a to the logic level "0" via the following Schmitt trigger 31a, thus inhibiting the receiver 72 and switching on the transmitter 71.

(c) When the data bus 6 is occupied by the transmission assembly U, then the receiver 72 receives a message from the remote control network via the audio frequency line 8. The control line 92a switches to the logic level "0", thus inhibiting the Schmitt trigger 31a and activating the data transmitter 22a via the inverter 23a so that the data transmitter 22a works onto the data bus 6. The analogous case applies to a further transmission assembly in case it occupies the data bus 6 instead of the transmission assembly U.

In the digital assembly D connected to the data bus 6, the relay 36 recognizes the busy condition and the inverter 34, with a logic level "0" that proceeds to the control signal input dl of the USART device 1 via the control line 91, inhibits the access of the USART device 1 to the bus 6. The same is true of further digital assemblies that may be connected to the bus 6.

When further transmission assemblies U are connected to the bus 6, then the relays thereof recognize the busy condition and the inverter 34 or, respectively, 34a switches off the receiver 72 and switches on the data transmitter 71 via the following Schmitt trigger 31 or, respectively, 31a.

Branching functions in transmission networks can be realized in a particularly simple manner with the assistance of the circuit arrangement without having additional logic operations or control signal lines required between the transmission assemblies.

In a modification of the illustrated circuit arrangement, it can also be advantageous not to drive the receiver active or passive dependent on the occupancy of the data bus, but to always maintain the receiver ready to receive in that its control input is permanently applied to ground potential.

Figure 2:
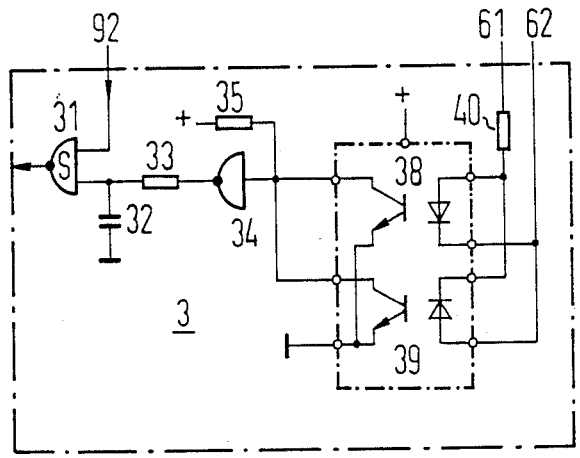
FIG. 2 is a schematic circuit diagram of a recognition circuit having an optocoupler.

FIG. 2 illustrates a recognition circuit that can be employed in the circuit arrangement for serial data transmission as illustrated in FIG. 1, instead of the recognition circuit 3 or, respectively, 3a. The recognition circuit 3 of the digital assembly D comprises, in FIG. 2, optocouplers 38 and 39 whose inputs are connected in antiparallel manner to the lead 61 and 62 of the data bus 6 via a resistor 40. The outputs of the output couplers 38 and 39 are connected to ground at one terminal and are interconnected in the manner of an OR gate and connected to the input of the inverter 34.

When data are transmitted via the data bus 6 one of the two diodes connected in antiparallel fashion respectively responds, the one at a signal condition and the other at a disconnect condition. When one of the two optocouplers is through-connected, then the inverter 34 reports that the data bus 6 is occupied.

Figure 3:
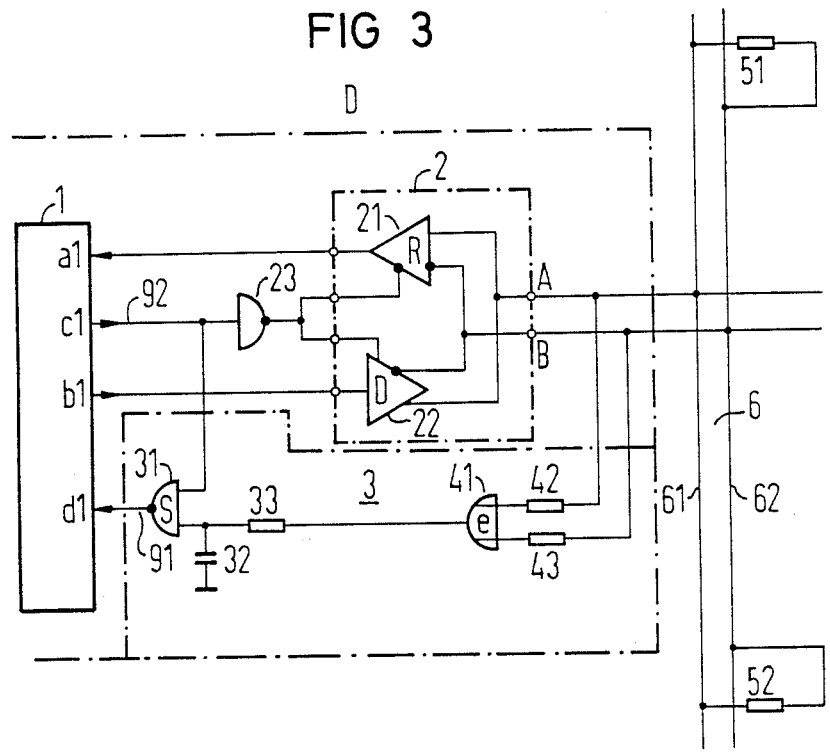
FIG. 3 is a schematic circuit diagram of a digital assembly of a circuit arrangement for serial data transmission, the digital assembly comprising an EXCLUSIVE OR gate in the recognition circuit.

Given the circuit arrangement for serial data transmission of FIG. 3, only one digital assembly and the data bus are shown. Further digital or transmission assemblies occur from the assemblies shown in FIG. 1 in that a recognition circuit of FIG. 3 is employed as the recognition circuit 3 or, respectively, 3a. The recognition circuit 3 of FIG. 3 comprises an EXCLUSIVE OR gate 41 whose inputs are respectively connected to the leads 61 and 62 of the data bus 6 via respective resistors 42 and 43. The output of the EXCLUSIVE OR gate 41 is connected to the Schmitt trigger 31 via the RC element 32, 33.

A pair of resistors 51 and 52 are connected to the data bus 6. These resistors are dimensioned such that the leads 61 and 62 of the data bus assume practically the same potential given passive data transmitters. Particularly serving as resistors 51 and 52 are terminating impedances which, preferably at the end of the line in the subscriber stations, terminate the data bus with its characteristic impedance in a known manner in order to enable a data transmission with a comparatively high bit rate. The EXCLUSIVE 0R gate is, in particular, a CMOS logic element that, as such, has comparatively high-impedance inputs and whose switching level at the inputs lies at about half the supply voltage which, in particular, lies at 5V.

When both leads 61 and 62 of the data bus 6 have the same potential, then the EXCLUSIVE OR gate recognizes that the data bus 6 is free. When the potentials at the data lines 61 and 62 differ from one another, then the EXCLUSIVE OR gate reports that the data bus 6 is busy.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. In a circuit arrangement for the serial data transmission between first and second subscriber stations connected to a respective first and second transmission/receiving device and each of said subscriber stations including a data transmitter and a data receiver, each data transmitter and each data receiver connected to two leads of a data bus via a respective transmission/receiving device, each of said transmitters including a signal input, a control input responsive to control signals such that only one of the transmitters is active at a time to output to the data bus a voltage of a first polarity or of a second polarity dependent on the state of a data signal applied to its signal input by the respective transmission/receiving device, each of the transmitters having a higher internal impedance in the passive condition than in the active condition, and each of the receivers operable in response to the polarity of the voltage on its input received from the data bus to output data to the respective transmission/receiving device, the improvement therein comprising:

a recognition circuit connected between the two leads of the data bus and the respective transmitter and receiver and operable to output a free signal having a first logic state given approximately identical voltages on the leads of the data bus and output a busy signal having a second logic state given different voltages on the leads of the data bus.

2. The improved circuit arrangement of claim 1, wherein:

said recognition circuit comprises an unpolarized relay connected across the leads of said data bus.

3. The improved circuit arrangement of claim 1, wherein:

said recognition circuit comprises two optocouplers each including an input connected in parallel with the leads of the data bus and antiparallel with respect to the other optocoupler, and each including an output isodirectionally connected in parallel with the output of the other optocoupler; and a resistor connected in series with one of the leads of the data bus and in series with the optocouplers such that the series circuit of the optocouplers and the resistor form a component of an evaluation arrangement which outputs a free signal having a first logic state giving identical logic levels at the inputs of the recognition circuit and which emits a busy signal having a second logic level given unequal logic levels at the inputs of said recognition circuit.

4. The improved circuit arrangement of claim 1, and further comprising:

a terminating impedance connected across the data bus leads at at least one subscriber station; and said recognition circuit comprises an EXCLUSIVE OR element connected to the leads of said data bus and connected to the respective subscriber station.

5. The improved circuit arrangement of claim 4, wherein:

each of said subscriber stations comprises an AND gate including a first input connected to said recognition circuit and a second input connected to the control input of said transmitter and controllable by the subscriber station such that the AND gate is enabled only when the respective data transmitter is in the passive condition.

6. The improved circuit arrangement of claim 3, and further comprising:

a Schmitt trigger including an input and an output;

a resistor-capacitor combination connected to said input of said Schmitt trigger; and means connecting said resistor-capacitor combination to said evaluation arrangement.

7. The improved circuit arrangement of claim 4, wherein:

said evaluation arrangement comprises a Schmitt trigger constructed as an AND circuit.

* * * * *